June 13, 1939. H. B. TUTHILL ET AL 2,162,138
AUTOMATIC BREAD SLICING MACHINE
Filed Aug. 17, 1936 3 Sheets-Sheet 2
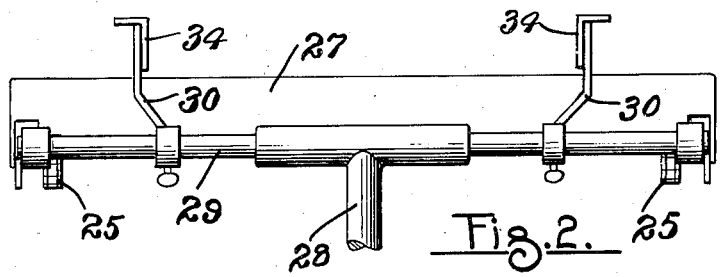
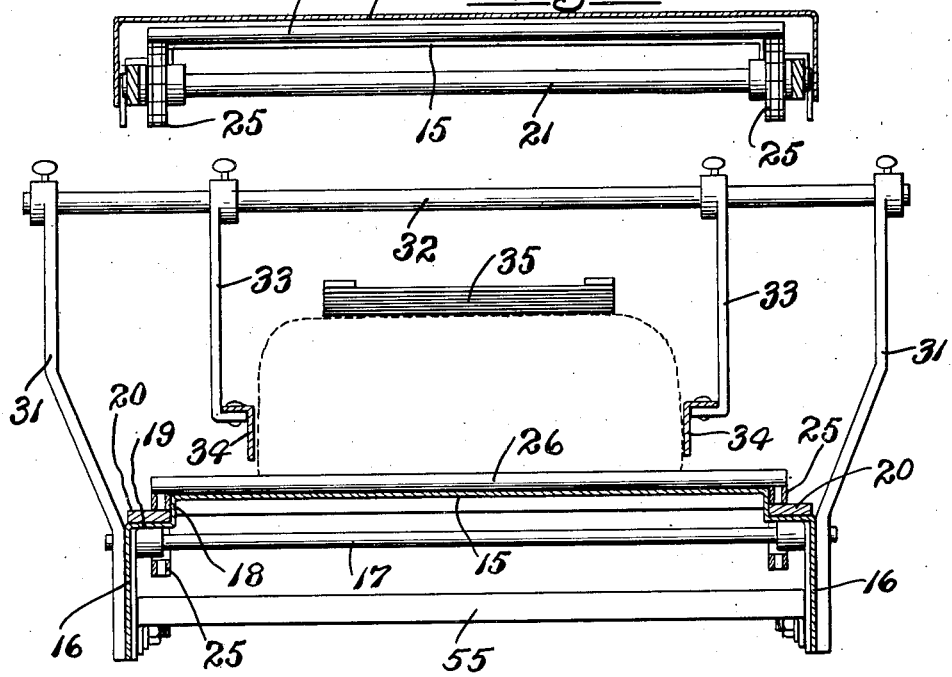
Inventors
Howard B. Tuthill
Harry F. Caldwell
By Linerance and
Van Antwerp
Attorneys

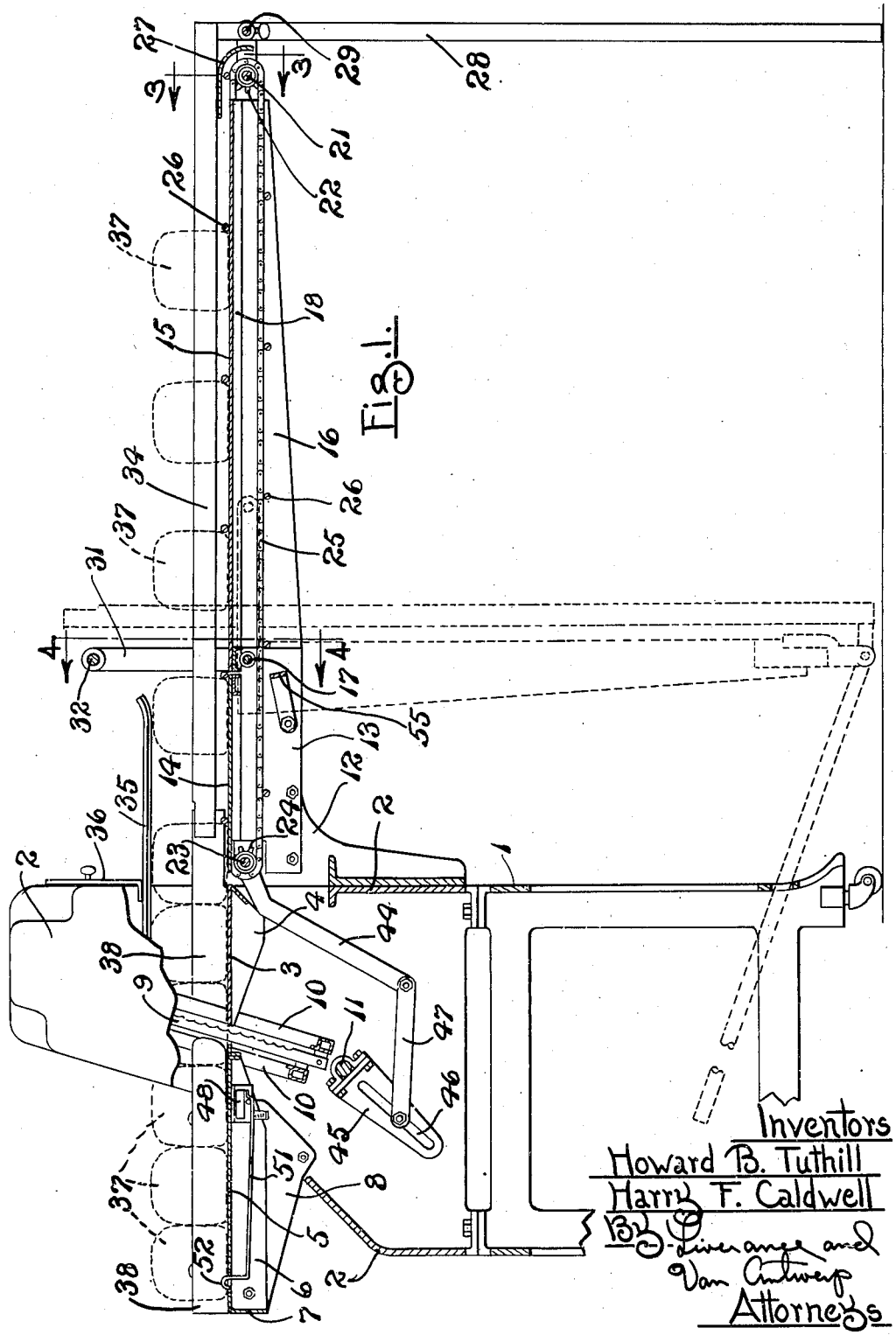

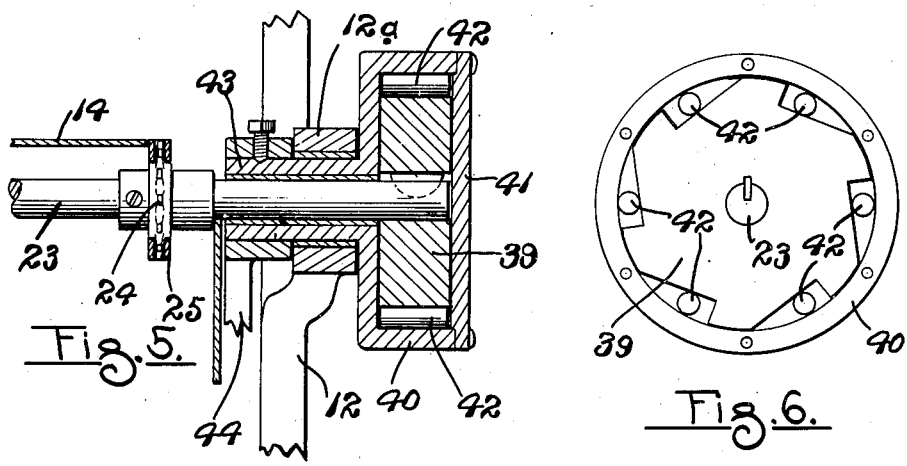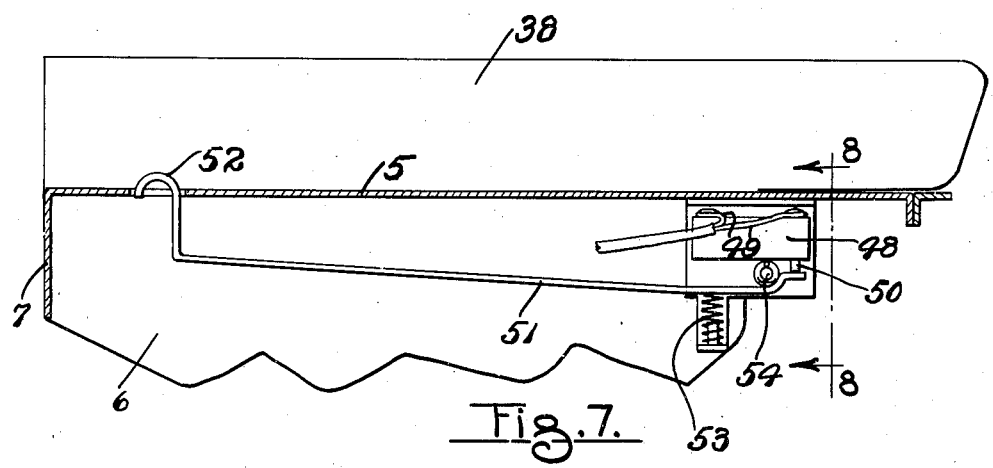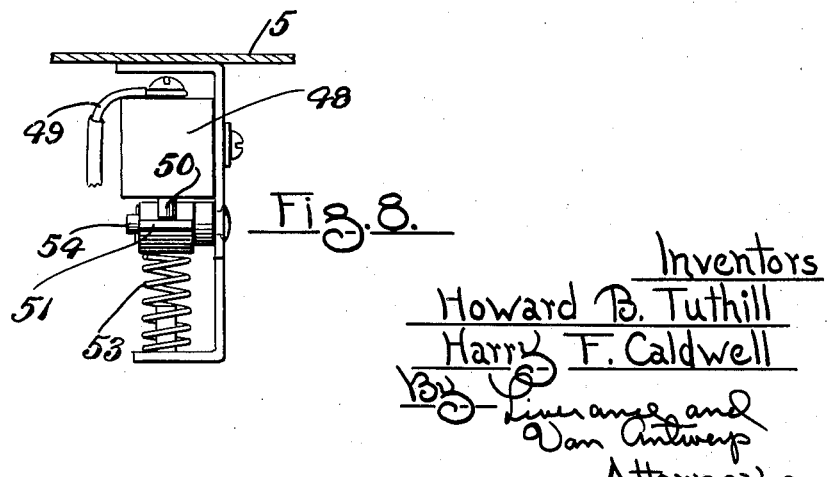

Patented June 13, 1939

2,162,138

UNITED STATES PATENT OFFICE 2,162,138

AUTOMATIC BREAD SLICING MACHINE

Howard B. Tuthill and Harry F. Caldwell, Grand Rapids, Mich., assignors to Oliver Machinery Company, Grand Rapids, Mich., a corporation of Michigan Application August 17, 1936, Serial No. 96,434

2 Claims. (Cl. 146—153)

This invention relates to bread slicing machines of the type employing reciprocating knives and mechanical means for feeding loaves of bread to and past the knives, these machines being preferably of the power driven type.

An object of this invention is to provide automatic feeding mechanism which will advance the loaves intermittently or step by step so that the loaves will be fed to the knives only during movement thereof and preferably during alternate movements of the knives so that the loaves may expand into the knives during their idle period.

Another object of the invention is to provide safety stop means which will automatically stop the machine if the sliced loaves are not removed therefrom as fast as they are sliced.

Another object of the invention is to provide a safety stop mechanism which, when operated, will stop a loaf of bread with the knives partially entered into it to obviate an overload on the driving motor in starting the machine with the knives in contact with the crust of the bread.

Another object of the invention is to provide a folding feeding conveyor mechanism which may be folded into condensed space when the machine is not in use.

The invention embodies various new and useful features of construction and operation hereafter more fully described and particularly pointed out in the claims, reference being had to the accompanying drawings, in which, Fig. 1 is a longitudinal section through the bread slicing machine of my invention in its unfolded operative position.

Fig. 2 is an end elevation of the feeding table looking at the right-hand end of the machine shown in Fig. 1.

Figs. 3 and 4 are transverse vertical sections on the planes of lines 3—3 and 4—4, respectively, on Fig. 1, looking in the direction indicated by the arrows.

Fig. 5 is a fragmentary sectional detailed view illustrating the roller clutch used in the operation of the step by step feed.

Fig. 6 is an end elevation of the roller clutch, the enclosing or cover plate being removed.

Fig. 7 is a fragmentary longitudinal section illustrating the automatic control for the electric switch which controls the motor for operating the machine, and Fig. 8 is a fragmentary transverse vertical section on the plane of line 8—8 of Fig. 7 looking in the direction indicated.

Like reference characters refer to like parts in the different figures of the drawings.

In construction, the machine comprises a supporting frame 1 (Fig. 1), above which is a housing 2 through which the loaves of bread pass as they are sliced and in which the slicing knives and the mechanism for operating the same are mounted. The bread loaves pass over a horizontal slicing table 3 which has downwardly extending sides 4 suitably connected with the housing 2 and which extends from one side of the table nearly through to the opposite side. In conjunction with the rear end of the table 3 is a delivery table 5 with downwardly extending sides 6 and a downwardly extending outer end 7, the table being carried by supporting brackets 8 which are bolted or otherwise permanently attached to the inner sides of the sides of the housing member 2. The tables 3 and 5 preferably are made from sheet metal, though not necessarily so.

Slicing knives 9, which occupy a position within the housing 2 somewhat inclined to the vertical, as shown in Fig. 1, are carried by reciprocating frames 10, there being two banks of the knives which reciprocate simultaneously in opposite directions as is usual in bread slicing machines. The knives pass through slots in the table 3 and the loaves of bread are sliced by the knives as they are fed successively to and past the knives.

The shaft 11 below the knife carrying frames 10 is rocked back and forth in the operation of the machine simultaneously with the reciprocation of the knives, the details of the mechanism for accomplishing such rocking movement being shown in our copending application, entitled Bread slicing machine, Ser. No. 738,622 now matured into Patent No. 2,095,620. The power for driving the entire mechanism is obtained from an electric motor, not shown.

The feed table over which the bread is carried to the slicing table 3 is positioned so that its upper surface is in the same plane with the upper surface of the slicing table. Brackets 12 extend from the housing member 2 and carry one section of a feed table which is made from a single plate of metal having depending sides 13 and a horizontal upper section 14, being permanently secured to the brackets 12 and extending outwardly in a horizontal direction a relatively short distance.

A second section of the feed table is mounted upon and extends from the depending sides 13 of the first section, comprising an upper horizontal section 15 with depending sides 16. In forming the table sections, between the edges of the horizontal member 15 and the depending sides 16 the metal is pressed or formed into the shape shown in Fig. 4, with depending flanges 18 bent downwardly from the side edges of the horizontal member 15 and then turned outwardly as horizontal ledges 19 for a distance being thereafter continued downwardly in the sides 16. Both of the table sections described are similarly formed. Above each of the ledges 19 is a wearing bar 20 which may be permanently secured in place.

The outer table section has a pivotal connection at the end of the inner fixed table section by means of a rod 17 (Fig. 4) which passes through the sides 13 and 16, the sides 16 overlapping the sides 13, and the rod passing through both, whereby the outer feed table section may be turned downwardly as indicated in dotted lines in Fig. 1.

At the outer end of the pivoted table section a shaft 21 is rotatably mounted between the sides 16, on which are spaced sprockets 22. A similar shaft 23, having spaced sprockets 24, is rotatably mounted on and between the supporting brackets 12 at the inner ends of the first feed table. Endless chains 25 pass around the sprockets 22 and 24, the upper runs thereof riding over the bars 20. Pusher bars 26 extend across and are connected to the chains 25 whereby in passing over the table parts 15 and 14 the bars are located directly over and in close proximity with the upper surfaces of the horizontal parts 14 and 15 of the two feeding table sections so that a loaf of bread placed ahead of the direction of movement of a bar 26 is engaged thereby and moved and delivered to the slicing table 3.

At the outer end of the pivoted section of the feeding table a suitable sheet metal guard 27 is secured and a supporting post 28 is pivotally mounted on and between the ends of a rod 29 which extends horizontally across and is carried by the outer pivoted table section a short distance beyond the shaft 21, the post being used to hold the outer feed table section in horizontal operative position as shown in Fig. 1. When the machine is to occupy a smaller space the post 28 is turned inwardly and as the outer table section is folded the post occupies the position shown in dotted lines in Fig. 1, being guided through a suitable opening in the frame 1 as shown. A bar 55 extends across the machine near the pivot rod 17 to hold the lower runs of the chains 25 in place when the table is folded.

Adjustable guides are provided for the bread loaves on the feed, slicing and delivery tables. Two vertically extending brackets 30, spaced apart from each other, are provided with hubs and thumb screws, the hubs being mounted on the rod 29 so that the brackets may be adjusted to different positions (Fig. 2). Two vertical standards 31 are permanently connected, one to each of the depending sides 16 of the pivoted section of the feed table, and between the same a rod 32 is carried on which two depending brackets 33 are adjustably mounted, their upper ends having hubs and thumb screws for such purpose (Fig. 4). Horizontal side guide bars 34, preferably of angle iron form, are attached to the brackets 30 and 33, these guide bars being spaced apart a distance slightly greater than the length of the loaves and being located a short distance above and parallel to the table members 14 and 15, said bars 34 at their front ends extending nearly to the housing 2 of the machine.

An overhead plate 35 is located horizontally in a plane substantially coincident with the upper side of the loaves and may be adjusted to different vertical positions through its mounting bracket 36 which is vertically adjustable on and secured to the housing 2 as shown in Fig. 1. The loaves 37, indicated in dotted outline, are guided between the bars 34, pass underneath the member 35 and are delivered to the slicing table 3 after which they are pushed ahead to the slicing knives by the succeeding loaves which are acted upon by the chains 25 and bars 26. The slicing table 3 and the delivery table 5 are likewise provided with upwardly extending guiding sides 38 to maintain the loaves against endwise movement as they are sliced and after they are sliced.

The shaft 23 at one end has a clutch member 39 (Figs. 5 and 6) keyed thereto which is located within a surrounding cup-like clutch housing 40, the open end of which is closed by a plate 41. Rollers 42 are disposed in the recesses of member 39, as shown in Fig. 6, between the inner clutch member 39 and the outer clutch member housing 40, this being one form of construction of the well known roller clutch, in which the two members 39 and 40 are connected together on turning movement in one direction but are free of each other on turning movement in the opposite direction.

The member 40 has a hollow hub 43 at its axis and extending through a suitable bearing 12a in the adjacent bracket 12. An arm 44 is rigidly secured to the hollow hub 43, through which the outer end of the shaft 23 passes, as shown in Fig. 5. A rocker arm 45 is secured to the rock shaft 11 and has an elongated slot 46 therein. A link 47 is pivotally connected to the lower end of the arm 44 (Fig. 1) and adjustably connected by a bolt and slot connection with the slotted arm 45 whereby, as the arm 45 rocks, the arm 44 is simultaneously rocked to a greater or less extent, dependent upon the point of connection of the link 47 with the arm 45, thereby turning the clutch member 40 first in one direction and then in the reverse direction resulting in intermittent rotation of the shaft 23 and step by step movement of the conveyor chains 25.

In machines of this character each outermost loaf on the delivery table 5 is successively removed for wrapping. We have provided an automatic safety switch to prevent the outermost loaf of bread or others following it from being pushed over the end of the delivery table. In the electric circuit which controls the electric motor driving the machine an electric switch 48 is interposed, being suspended as shown in Fig. 8, below the table 5. From this switch the circuit wires 49 lead and depending from one end thereof is a pin 50 the raising of which opens the switch and breaks the electric circuit to the motor. A lever 51 is located beneath the delivery table 5 and has an end portion turned upwardly and terminating in a curved cam portion 52 which normally passes upwardly through an opening in the delivery table 5, being lifted by a compression spring 53 so as to turn the same about a pivot 54 on which the lever 51 is mounted. The opposite end of the lever comes directly beneath the pin 50. When a sliced loaf 37 passes over the delivery table 5 so as to reach the cam member 52 and depress it, pin 50 is lifted, the switch opened and the circuit broken, stopping the motor and the machine. The location of the part 52, with reference to the slicing knives 9, is such that whenever the motor is thus automatically stopped a loaf of bread will be so positioned with respect to the slicing knives that the knives will have cut part way through the loaf as shown in Fig. 1.

It will be seen that this mechanism causes the knives to reciprocate and at the same time the loaves to be fed to the knives step by step in synchronism with the movement of the knives and only while they are moving and furthermore the loaves will be fed to the knives only during alternate reciprocations thereof. The bread which is to be sliced is almost invariably very fresh and exceedingly compressible and when fed against the knives the loaf will compress and by this mechanism which permits the loaf to stand idle during alternate movements, of the knives, the loaf is permitted to expand into the knives without being fed toward them during each alternate knife movement resulting in the loaf being delivered sliced in relatively uncompressed condition and of superior texture.

It is conceived that this machine can be modified by the addition of another clutch element acting to turn the shaft 23 upon the opposite rocking movement of the rock shaft 11 than the one shown and described in which case the loaves would be fed intermittently to the knives during each reciprocation thereof but only during movement of the knives, and in such modification, as well as in the structure shown, the movement of the loaf to the knives is in direct ratio to the speed of movement of the knives and at the end of each reciprocation of the knives when there is no movement of them the loaves are correspondingly idle so that there is no movement of the loaf against the knives when they are not moving and therefore not cutting which would cause undesirable compression of the loaf.

The loaves, after leaving the knives, should be removed one by one to be wrapped which is the most expeditious way of handling the sliced loaf. Sufficient distance is allowed on the delivery table 5 for a loaf to be fully ejected from the machine and accessible for removal and at the end of such predetermined distance the stop lever 51 is actuated by contact with the loaf with its cam portion 52 whereby, in case the operator should not remove the loaves as fast as they are delivered from the machine, the machine will be automatically stopped. Furthermore, the location of the loaves when the machine is so stopped has been calculated to be such that the knives will be in substantially mid position of a loaf so that when the machine is again started the knives will actuate upon the center and soft portion of the loaf and the motor will not be subjected to an overload starting torque as would occur if the knives were in contact with the outer crust of the bread at the time the machine was started.

The folding feature of the feed table permits the machine to occupy relatively small space when not in use and inasmuch as the machine as ordinarily constructed would have a feeding table of considerable length, folding thereof reduces the floor space occupied by the machine substantially one-half.

The invention is defined in the appended claims and is to be considered comprehensive of all forms of structure coming within their scope.

I claim:

1. A slicing machine of the class described comprising feed and delivery tables, two banks of knives, means for alternately reciprocating said banks, means to feed loaves to and past said knives step by step only during the downward movement of one of said banks, and means to automatically stop said feed mechanism and said knives while said knives are substantially in the center of a loaf and when the outermost loaf reaches the end of said delivery table.

2. The combination of elements as defined in claim 1, said last named means including a switch located near the end of the delivery table, a pivotally mounted arm having one end adjacent said switch and the other end extending upwardly through a slot near the end of the delivery table whereby a loaf nearing the end of the delivery table will depress said arm thereby opening the switch and stopping the machine.

HOWARD B. TUTHILL.
HARRY F. CALDWELL.